United States Patent [19]
Hunsberger

[11] Patent Number: 6,167,282
[45] Date of Patent: Dec. 26, 2000

[54] METHOD AND APPARATUS FOR UPDATING SITE RANKING FACTORS IN A WIRELESS COMMUNICATION SYSTEM

[75] Inventor: Gary P. Hunsberger, County of Cook, Ill.

[73] Assignee: Motorola, Inc., Schaumburg, Ill.

[21] Appl. No.: 09/099,681

[22] Filed: Jun. 18, 1998

[51] Int. Cl.[7] .................................................. H04B 7/00
[52] U.S. Cl. ......................... 455/513; 455/517; 455/437; 455/525
[58] Field of Search .................................... 455/513, 517, 455/62, 437, 438, 439, 522, 525, 450, 453, 67.1, 226.1, 226.2

[56] References Cited

U.S. PATENT DOCUMENTS

| | | | |
|---|---|---|---|
| 5,471,670 | 11/1995 | Hess et al. | 455/437 |
| 5,809,430 | 9/1998 | D'Amico | 455/525 |
| 5,845,212 | 12/1998 | Tanaka | 455/437 |
| 5,854,981 | 12/1998 | Wallstedt et al. | 455/439 |
| 5,915,221 | 6/1999 | Sawyer et al. | 455/437 |
| 5,966,657 | 10/1999 | Sporre | 455/437 |

OTHER PUBLICATIONS

"Applications of CDMA in Wireless/Personal Communications", Vijay K. Garg, Kenneth F. Smolick, Joseph E. Wilkes, published by Prentice Hall PTR, 1997.

*Primary Examiner*—Nay Maung
*Assistant Examiner*—Quochien B. Vuong
*Attorney, Agent, or Firm*—Srteven R. Santema

[57] ABSTRACT

A subscriber unit (300) receives an inbound transmission feedback message regarding at least one inbound transmission made by the subscriber unit (401). Based on the inbound transmission feedback message, the subscriber unit updates at least one site ranking factor corresponding to the subscriber unit's current site (402). In another embodiment, a site (600) determines the signal quality information for at least one inbound transmission made by a subscriber unit (702) and, when the signal quality information is unfavorable, transmits a message instructing the subscriber unit to update at least one site ranking factor (704). The subscriber unit can compute new site rankings based on the site ranking factors and select, if necessary, a new site having a preferable site ranking (403–405).

15 Claims, 4 Drawing Sheets

METHOD AND APPARATUS FOR UPDATING SITE RANKING FACTORS IN A WIRELESS COMMUNICATION SYSTEM

FIELD OF THE INVENTION

The present invention relates generally to wireless communication systems and, in particular, to a method and apparatus for updating site ranking factors therein.

BACKGROUND OF THE INVENTION

Wireless communication systems are well-known in the art. In such systems, a plurality of subscriber units (such as in-hand portable and/or vehicle-mounted mobile radios) are provided communication services via wireless communication with a fixed infrastructure. The fixed infrastructure typically comprises a plurality of sites in communication with each other. Each site has a corresponding coverage area. Any subscriber units currently operating within the coverage area of a given site are serviced by that site. As subscriber units roam throughout a system, they can leave the coverage area of one site and enter the coverage area of another site. In order to provide seamless service throughout multiple coverage areas, subscriber units must determine (or be instructed) when to change affiliations between sites.

In order to determine when to de-affiliate with a current site and affiliate with another site, it is known in the art for subscriber units to maintain site rankings for various sites. Site rankings are used to compare the relative "quality" of service provided by various sites. Thus, each subscriber unit continuously maintains and assesses site rankings in order to select the best possible site with which to affiliate. A variety of factors are measured and/or tracked in order to determine each site ranking maintained by a subscriber unit. Examples of such factors include, but are not limited to: the received signal strength at the subscriber unit for outbound transmissions from a given site; whether the subscriber unit has ever been denied access to the given site; whether a given site is geographically adjacent to a subscriber unit's current site; and the bit error rate at the subscriber unit for outbound transmissions from the given site. As these examples demonstrate, current techniques for assessing site rankings are generally based on outbound transmissions (i.e., from a site to a subscriber unit), and not inbound transmissions (i.e., from a subscriber unit to a site). This technique is acceptable in those instances where outbound transmission quality is equivalent to inbound transmission quality, as would be the case in an ideal, well-designed system. In the present context, equivalence in quality is measured by equivalence in communication range; equivalence occurs when the outbound range of given site is equal to the inbound range. In such a system, a subscriber unit at the edge of a given site's coverage area will be able to transmit and receive communications equally well.

However, in practice it is often that case that inbound transmission quality is not equivalent to outbound transmission quality. This can be a result of several causes. For example, the overall system could be poorly designed. Alternatively, the system could have been designed for use only by mobile radios having relatively high transmit powers, but where some lower power portable radios were added later. In yet another instance, variances in terrain surrounding a site's transmitter and receivers (which may not necessarily be co-located) can causes differences in coverage. Regardless of the cause, differences in outbound and inbound ranges and current site ranking techniques that rely solely on outbound measurements can cause a subscriber unit to affiliate with a site that has a good site ranking due to its outbound coverage, but that provides inadequate inbound coverage. Therefore, it would be an advance over the current state of the art to incorporate inbound quality measurements into site ranking determinations.

DESCRIPTION OF A PREFERRED EMBODIMENT

Generally, the present invention provides a method and apparatus for updating site ranking factors in a wireless communication system. In one embodiment, a subscriber unit receives an inbound transmission feedback message regarding at least one inbound transmission made by the subscriber unit. Based on the inbound transmission feedback message, the subscriber unit updates at least one site ranking factor corresponding to the subscriber unit's current site. Preferably, the subscriber unit degrades the at least one site ranking factor when signal quality information, included in the inbound transmission feedback message, is unfavorable and when the subscriber unit is already transmitting at an effective maximum transmission power. In another embodiment, the site determines the signal quality information for at least one inbound transmission made by a subscriber unit and, when the signal quality information is unfavorable, transmits a message instructing the subscriber unit to update at least one site ranking factor. Regardless of the method used to update the site ranking factor(s), the subscriber unit can compute new site rankings based on the site ranking factors and select, if necessary, a new site having a preferable site ranking. In this manner, the present invention incorporates information regarding quality of inbound transmissions made by the subscriber unit into the site selection process.

Figure 1:
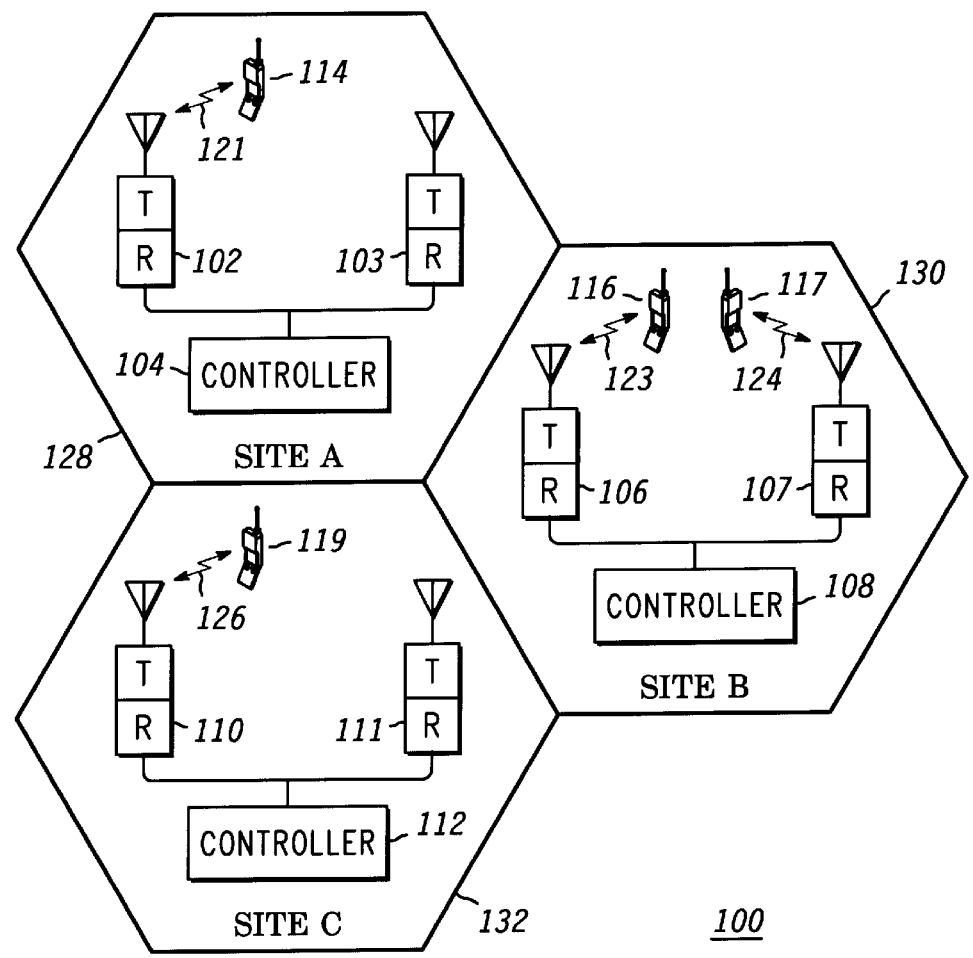
FIG. 1 is a block diagram of a wireless communication system in accordance with the present invention.

The present invention may be more fully described with reference to FIGS. 1–7 and accompanying text. FIG. 1 illustrates a wireless communication system 100 comprising infrastructure equipment 102–112 in communication with a plurality of subscriber units 114–119 via wireless communication resources 121–126. In the preferred embodiment, the wireless communication system 100 comprises a two-way, wide-area digital trunked radio system such as an "ASTRO" radio communication system by Motorola, Inc. However, those having ordinary skill in the art will recognize that the teachings of the present invention are equally applicable to any wireless communication system adapted to use site rankings.

The infrastructure equipment 102–112 comprises base stations 102–103, 106–107, 110–111 and controllers 104, 108, 112 arranged into sites, each site giving rise to a respective coverage area 128–132. As shown in FIG. 1, site A comprises base stations labeled 102–103 and the controller labeled 104; site B comprises base stations labeled 106–107 and the controller labeled 108; and site C comprises base stations labeled 110–111 and the controller labeled 112. The controllers 104, 108, 112 control resource allocation and call management within their respective sites, as known in the art. In practice, the controllers 104, 108, 112 are networked together. Furthermore, each of the controllers 104, 108, 112 comprises memory and processing platforms (not shown) for use in executing stored software algorithms. Typically, the wireless communication system 100 also comprises other infrastructure equipment (such as centralized mobility managers, consoles, switches, network managers, etc.) not pertinent to the present invention and therefore not shown in FIG. 1. In the preferred embodiment, the wireless communication resources 121–126 are radio frequency (RF) channels capable of supporting frequency-division multiplexed (FDM), time-division multiplexed (TDM) and/or code-division multiplexed (CDM) protocols.

Figure 2:
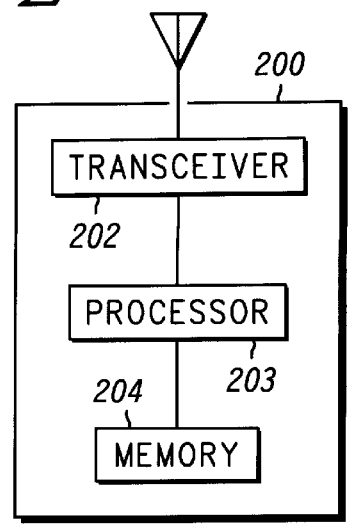
FIG. 2 is a block diagram of a subscriber unit and/or a base station in accordance with the present invention.

FIG. 2 illustrates a high-level configuration of a subscriber unit 114–119 and/or base station 102–103, 106–107, 110–111 in accordance with the present invention. Examples of such subscriber units and base stations include "ASTRO" "SABER" portable radios and "QUANTAR" base stations by Motorola, Inc. In particular, the general configuration includes a wireless transceiver 202 arranged to transmit and receive wireless signals coupled to a processor 203. The processor 203 (such as a computer, microprocessor, microcontroller, digital signal processor or combination thereof as known in the art) is also coupled to memory 204 (such as volatile and non-volatile memory devices, as known in the art). The memory 204 stores software instructions that, when executed by the processor 203, reconfigure the functionality of the processor 203 to perform a variety of tasks, including operations on signals transmitted and received via the transceiver 202. Additionally, the memory 204 stores data to be manipulated by the processor in supporting operation of the subscriber unit/base station.

Figure 3:
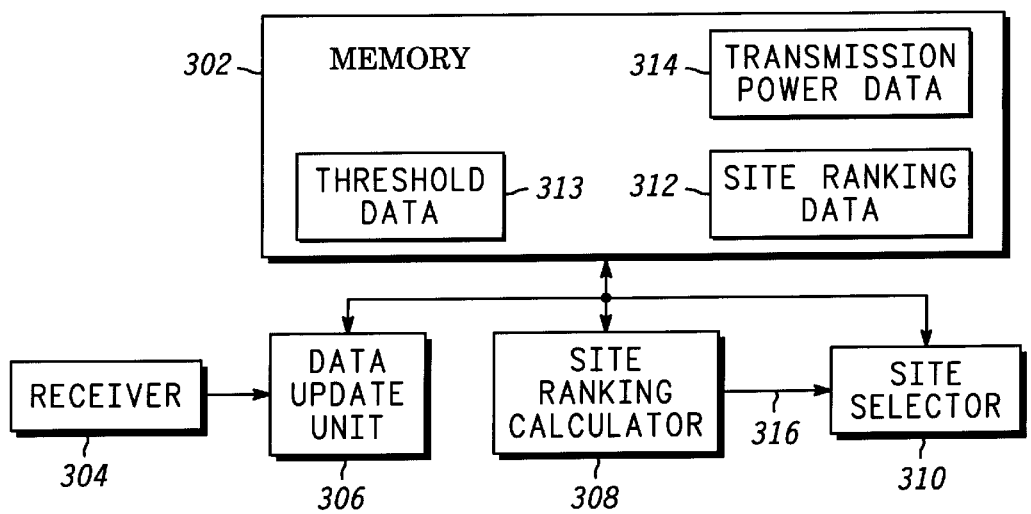
FIG. 3 is a block diagram illustrating a subscriber unit in accordance with the present invention in greater detail.
Figure 4:
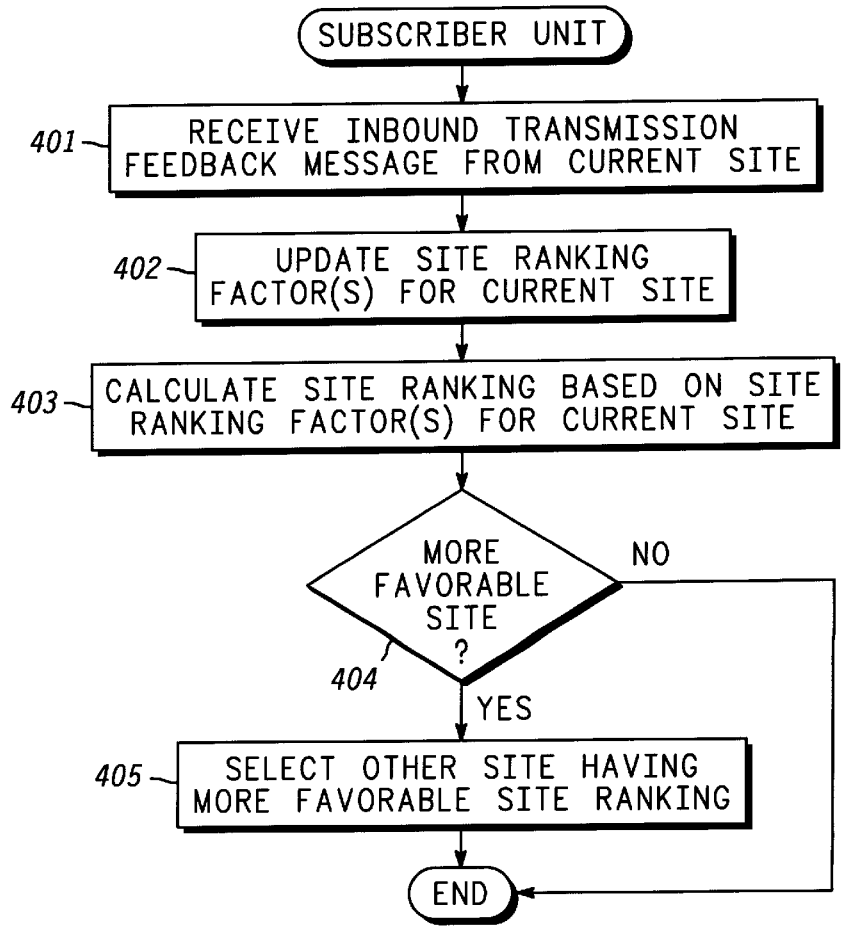
FIG. 4 is a flow chart of a method for use in the subscriber unit of FIG. 3.

Operation of a subscriber-based implementation of the present invention may be further described with reference to FIGS. 3–5. FIG. 3 illustrates a subscriber unit 300 comprising a memory 302, receiver 304, data update unit 306, site ranking calculator 308 and site selector 310 arranged as shown. In the preferred embodiment, at least the data update unit 306, site ranking calculator 308 and site selector 310 are implemented within a processor (not shown) executing instructions stored in the memory 302. Operation of the subscriber unit 300 is described in further detail with reference to FIGS. 4 and 5.

At step 401, the subscriber unit receives an inbound transmission feedback message, via the receiver 304, from its current site. In the context of the present invention, a current site is the site with which a given subscriber unit is currently affiliated. In general, the inbound transmission feedback message comprises information regarding the relative quality of at least one inbound transmission previously made by the subscriber unit. In the preferred embodiment, such information is signal quality information in the form of a received signal strength (RSS) and/or bit error rate (BER) corresponding to the at least one inbound transmission. The determination of RSS and BER information is well-known in the art. However, it is anticipated that the inbound transmission feedback message may alternatively comprise an indication for the subscriber unit to increase/decrease its transmission power, such as that used in cellular telephone systems adhering to the Telecommunications Industry Association/Electronic Industries Association Interim Standard 95 (TIA/EIA/IS-95).

As step 402, the data update unit 306 updates at least one site ranking factor within the site ranking data 312 in response to the inbound transmission feedback message. This update function includes upgrading and downgrading the at least one site ranking factor. In general, an upgrade to a site ranking factor means changing the status of the site ranking factor such that it increases the overall site ranking (make more favorable) for the corresponding site. Conversely, a downgrading of a site factor will cause the site ranking factor to decrease the overall site ranking (make less favorable) for the site. In this manner, the present invention incorporates the relative quality of inbound transmissions into site ranking, unlike prior art methods which relied only on the relative quality of outbound transmissions.

There are a variety of ways to determine when one or more site ranking factors should be degraded. A preferred method is illustrated in FIG. 5. Thus, within step 402, the data update unit 306 first determines, at step 501, whether signal quality information, such as RSS or BER, included in the inbound transmission feedback message is favorable by comparing the signal quality information against threshold data 313. For example, if the RSS is below a predetermined threshold value, then the signal quality information is considered unfavorable. Alternatively, or additionally, a BER above another predetermined threshold indicates unfavorable signal quality information. The actual values of these predetermined thresholds are a matter of design choice.

If the signal quality information is unfavorable, the data update unit 306, at step 502, accesses transmission power data 314 to determine whether the subscriber unit 300 is currently operating at an effective maximum transmission power. In the preferred embodiment, the effective maximum transmission power is upper limited by the actual transmit power limitations of the subscriber unit itself. Alternatively, the effective maximum transmission power may be a user-defined power level less than the actual limit of the subscriber unit. If the subscriber unit is not currently operating at the effective maximum transmission power, then the subscriber unit increases its transmission power at step 506 in an effort to improve the inbound transmission quality (range). However, if the subscriber unit is currently operating at the effective maximum transmission power, a counter is incremented at step 503. Initialized to zero whenever the subscriber unit accesses a voice channel (either as a transmitting unit or as a receiving unit), the counter keeps track of the number of times unfavorable signal quality information is received while the subscriber unit is operating at the effective maximum transmission power.

At step 504, the counter is compared to a predetermined threshold value stored in the threshold data 314. In the preferred embodiment, the counter threshold is set to no less than two in order to account for the possibility of momentary fade conditions or transient areas of poor inbound coverage, e.g., when a subscriber unit transmits while traveling through a tunnel. When the counter exceeds the predetermined threshold, the data update unit 306, at step 505, degrades at least one site ranking factor corresponding to subscriber unit's current site. For example, in the preferred embodiment, the subscriber unit maintains for each site a boolean site ranking factor that keeps track of if an inbound voice channel failure has not been detected. This site ranking factor is initialized to a "true" state, indicating that no inbound voice channel failure has been detected. However, when the counter threshold has been exceeded, the data update unit 306 sets this site ranking factor to a "false" state, indicating that an inbound voice channel failure has been detected.

Figure 5:
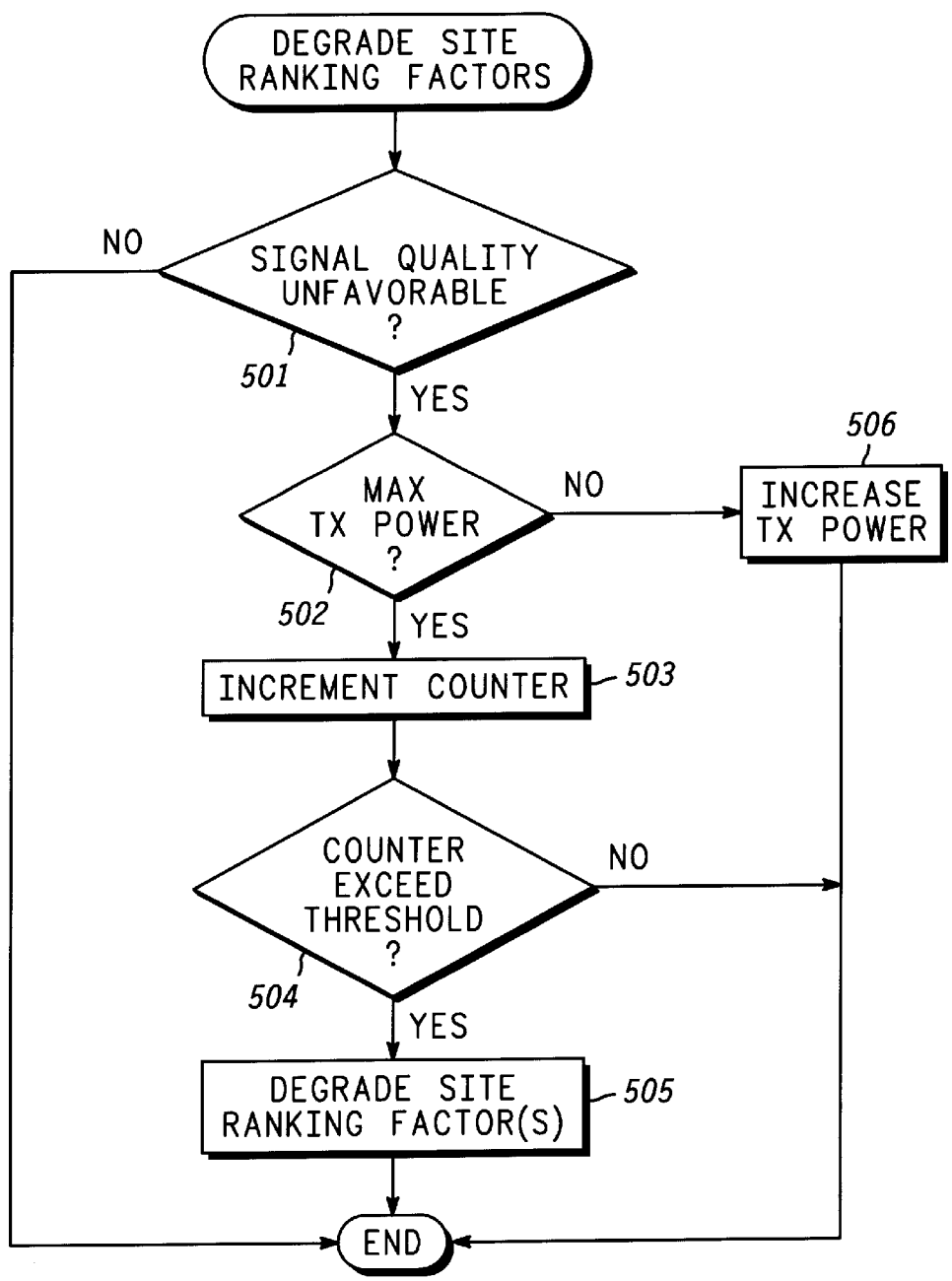
FIG. 5 is a flow chart illustrating a preferred method for the subscriber unit of FIG. 3 to update at least one site ranking factor.

It is anticipated that methods other than that illustrated in FIG. 5 can be used to determine when to degrade one or more site ranking factors. Rather than combining the signal quality information with information regarding the effective maximum transmission power, the subscriber unit can simply degrade the site ranking factor whenever the signal quality information is unfavorable. In those instances where the inbound feedback message does not comprise signal quality information such as RSS or BER, but rather comprises an indication instructing the subscriber unit to increase transmission power, the subscriber unit can maintain a counter that keeps track of the number of consecutively received increase power messages. When the counter exceeds a counter threshold, or when the counter indicates that the effective maximum transmission power has been exceeded, the subscriber unit can degrade the at least one site ranking factor.

Returning to FIG. 4, after having updated the at least one site ranking factor for the current site, the site ranking calculator 308 accesses the site ranking data 312 (including the at least one site ranking factor for the current site) and calculates new site rankings for each site represented in the site ranking data 312. In the preferred embodiment, the site ranking factors are themselves ranked according to their relative importance in determining relative quality for a site. Each site ranking factor takes on a boolean value, i.e., a value of "1" for a "true" state and a value of "0" for a "false" state, where a "true" state is favorable to a site ranking and a "false" state is unfavorable to the site ranking. Thus, each site ranking can be represented as a numeric, ordered bit string with the most important factor occupying the most significant bit down to the least significant factor occupying the least significant bit. Thus, the site rankings 316 are numeric values, with the best site corresponding to the site ranking having the highest value.

At step 404, the site selector 310 compares the site ranking for the current site against all other site rankings. If a more favorable site is found, i.e., if a site ranking having a higher value is found, then the site selector 310 updates the site ranking data 312 at step 405 to reflect that the current site is now the site found to have the higher site ranking. In practice, the update to the site ranking data 312 may be executed only after locking onto the control channel for the new site. In this manner, a subscriber unit can perform site selection based at least in part upon inbound quality data, unlike prior art methods.

Figure 6:
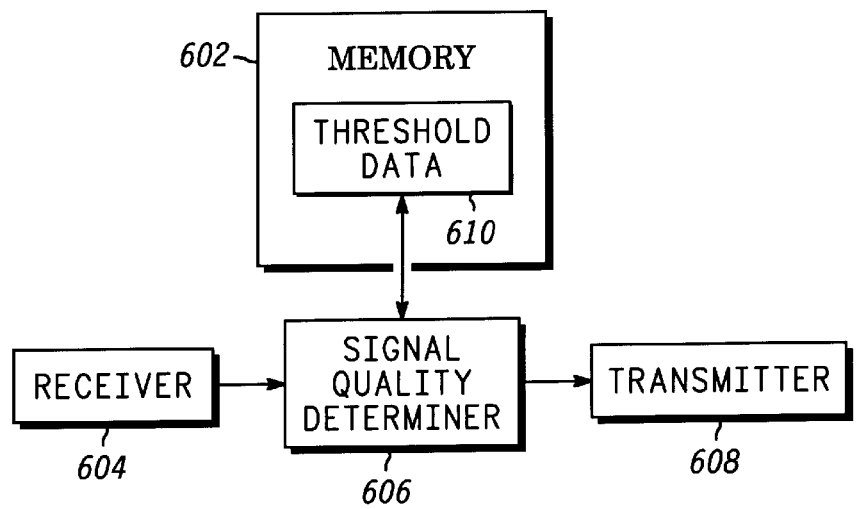
FIG. 6 is a block diagram illustrating a site in accordance with the present invention in greater detail.
Figure 7:
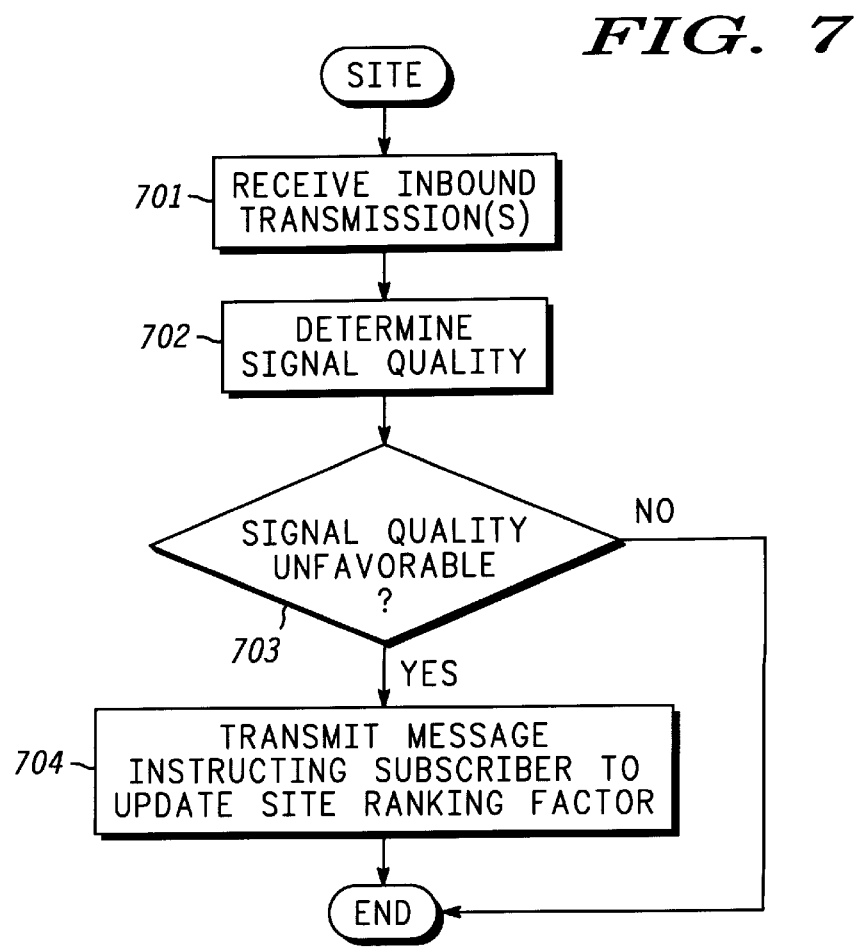
FIG. 7 is a flow chart of a method for use in the site of FIG. 6.

Operation of a site-based implementation of the present invention may be further described with reference to FIGS. 6 and 7. FIG. 6 illustrates a site 600 comprising a memory 602, receiver 604, signal quality determiner 606 and a transmitter 608 arranged as shown. In the preferred embodiment, the receiver 604 and transmitter 608 are located within one or more base stations. Additionally, at least the signal quality determiner 606 is implemented within a processor (not shown) executing instructions stored in the memory 602. Such processor and memory 602 could reside within a base station or controller forming part of the site. Operation of the site 600 is described in further detail with reference to FIG. 7.

At step 701, the site receives, via the receiver 604, at least one inbound transmission from a subscriber unit currently operating within the coverage area of the site. In the preferred embodiment, the at least one inbound transmission is a voice transmission made on a voice (traffic) channel. Of course, any inbound transmissions susceptible to signal quality measurements may be used as an alternative or in addition to voice channel transmissions. At step 702, the signal quality determiner 606 processes information provided by the receiver 604 to obtain signal quality information regarding the at least one inbound transmission. Where more than one inbound transmission is used, the signal quality information can reflect a combination of the various transmission used, i.e., through averaging or similar process. Preferably, the signal quality information comprises RSS and/or BER information.

At step 703, it is determined if the signal quality information is unfavorable. As described above, this determination is performed by comparing the signal quality information against one or more predetermined thresholds. If the signal quality information is unfavorable, the transmitter 608 is used to transmit an inbound transmission feedback message that instructs the subscriber unit to update at least one site ranking factor corresponding to the site 600. In the preferred embodiment, the inbound transmission feedback message comprises an instruction that will cause the subscriber unit to degrade the at least one site ranking factor. In this manner, the subscriber unit does not have to receive any signal quality information, but can perform updates to site ranking factors directly.

The present invention provides a method and apparatus for updating site ranking factors in a wireless communication system. By incorporating information regarding quality of inbound transmissions into the decision to update site ranking factors, the present invention provides a more reliable basis upon which a subscriber unit can assess site rankings. This represents an advance over prior art techniques that did not incorporate such information in the site ranking process.

The foregoing description of a preferred embodiment of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

I claim:

1. In a wireless trunked radio communication system comprising a plurality of subscriber units in wireless communication with a plurality of sites, wherein a current site of the plurality of sites provides inbound transmission feedback to a subscriber unit of the plurality of subscriber units, a method for the subscriber unit to update at least one site ranking factor corresponding to the current site, the method comprising steps of:

receiving, from the current site, an inbound transmission feedback message comprising information regarding at least one inbound transmission made by the subscriber unit; and updating, responsive to the inbound transmission feedback message, the at least one site ranking factor corresponding to the current site;

calculating a site ranking corresponding to the current site based at least in part upon the at least one site ranking factor corresponding to the current site; and selecting an other site of the plurality of sites when a site ranking corresponding to the other site compares favorably with the site ranking corresponding to the current site.

2. The method of claim 1, wherein the inbound transmission feedback message further comprises signal quality information regarding the at least one inbound transmission made by the subscriber unit, and wherein the step of updating further comprises a step of:

degrading the at least one site ranking factor when the signal quality information compares unfavorably with a signal quality threshold.

3. The method of claim 1, wherein the inbound transmission feedback message further comprises an indication instructing the subscriber unit to increase transmission power, and wherein the step of updating further comprises a step of:

degrading the at least one site ranking factor when the subscriber unit is currently operating at an effective maximum transmission power.

4. In a wireless trunked radio communication system comprising a plurality of subscriber units in wireless communication with a plurality of sites, wherein a current site of the plurality of sites provides inbound transmission feedback to a subscriber unit of the plurality of subscriber units, a method for the subscriber unit to update at least one site ranking factor corresponding to the current site, the method comprising steps of:

receiving, from the current site, an inbound transmission feedback message comprising information regarding at least one inbound transmission made by the subscriber unit;

determining, responsive to the inbound transmission feedback message, that the subscriber unit should increase transmission power; and degrading the at least one site ranking factor corresponding to the current site when the subscriber unit is currently operating at an effective maximum transmission power;

calculating a site ranking corresponding to the current site based at least in part upon the at least one site ranking factor corresponding to the current site; and selecting an other site of the plurality of sites when a site ranking corresponding to the other site compares favorably with the site ranking corresponding to the current site.

5. The method of claim 4, wherein the inbound transmission feedback message further comprises signal quality information regarding the at least one inbound transmission made by the subscriber unit, and wherein the step of degrading further comprises steps of:

incrementing a counter when the signal quality information compares unfavorably with a signal quality threshold; and degrading the at least one site ranking factor corresponding to the current site when the counter exceeds a counter threshold.

6. The method of claim 4, wherein the inbound transmission feedback message further comprises an indication instructing the subscriber unit to increase transmission power, and wherein the step of degrading further comprises steps of:

incrementing a counter only when the indication is consecutively received relative to previous indications instructing the subscriber unit to increase power; and degrading the at least one site ranking factor corresponding to the current site when the counter exceeds a counter threshold.

7. In a wireless trunked radio communication system comprising a plurality of subscriber units in wireless communication with a plurality of sites, wherein a current site of the plurality of sites provides inbound transmission feedback to a subscriber unit of the plurality of subscriber units, a method for the current site to update at least one site ranking factor maintained by the subscriber unit and corresponding to the current site, the method comprising steps of:

receiving, from the subscriber unit, at least one inbound transmission;

determining signal quality information regarding the at least one inbound transmission; and transmitting an inbound transmission feedback message to the subscriber unit responsive to the signal quality information, wherein the inbound transmission feedback message instructs the subscriber unit to update the at least one site ranking factor corresponding to the current site.

8. The method of claim 7, wherein the inbound transmission feedback message instructs the subscriber unit to degrade the at least one site ranking factor when the signal quality information compares unfavorably with a signal quality threshold.

9. A subscriber unit for use in a wireless trunked radio communication system comprising a plurality of sites, the subscriber unit comprising:

a receiver having an input operably coupled to receive wireless signals from a current site of the plurality of sites and an output that provides an inbound transmission feedback message comprising information regarding at least one inbound transmission made by the subscriber unit;

a processor operably coupled to the receiver and arranged to receive the inbound transmission feedback message; and a memory, coupled to the processor, comprising instructions that, when executed by the processor cause the processor to comprise:

a data update unit that updates at least one site ranking factor corresponding to the current site responsive to the inbound transmission feedback message;

means for calculating a site ranking corresponding to the current site based at least in part upon the at least one site ranking factor corresponding to the current site; and means, coupled to the means for calculating, for selecting an other site of the plurality of sites when a site ranking corresponding to the other site compares favorably with the site ranking corresponding to the current site.

10. The subscriber unit of claim 9, wherein the inbound transmission feedback message further comprises signal quality information regarding the at least one inbound transmission made by the subscriber unit, and wherein the data update unit degrades the at least one site ranking factor when the signal quality information compares unfavorably with a signal quality threshold.

11. The subscriber unit of claim 9, wherein the inbound transmission feedback message further comprises an indication instructing the subscriber unit to increase transmission power, and wherein the data update unit degrades the at least one site ranking factor when the subscriber unit is currently operating at an effective maximum transmission power.

12. A subscriber unit for use in a wireless trunked radio communication system comprising a plurality of sites, the subscriber unit comprising:

means for receiving, from a current site of the plurality of sites, an inbound transmission feedback message comprising information regarding at least one inbound transmission made by the subscriber unit;

means, operably coupled to the means for receiving, for determining, responsive to the inbound transmission feedback message, that the subscriber unit should increase transmission power; and means, operably coupled to the means for determining and the means for receiving, for degrading at least one site ranking factor corresponding to the current site when the subscriber unit is currently operating at an effective maximum transmission power;

means, arranged to receive the at least one site ranking factor corresponding to the current site, for calculating a site ranking corresponding to the current site based at least in part upon the at least one site ranking factor corresponding to the current site; and means, operably coupled to the means for calculating, for selecting an other site of the plurality of sites when a site ranking corresponding to the other site compares favorably with the site ranking corresponding to the current site.

13. The subscriber unit of claim 12, wherein the inbound transmission feedback message further comprises signal quality information regarding the at least one inbound transmission made by the subscriber unit, and wherein the means for degrading further comprise:

means for incrementing a counter when the signal quality information compares unfavorably with a signal quality threshold; and means, operably coupled to the means for incrementing, for degrading the at least one site ranking factor corresponding to the current site when the counter exceeds a counter threshold.

14. The subscriber unit of claim 12, wherein the inbound transmission feedback message further comprises an indication instructing the subscriber unit to increase transmission power, and wherein the means for degrading further comprise:

means for incrementing a counter only when the indication is consecutively received relative to previous indications instructing the subscriber unit to increase power; and means, operably coupled to the means for incrementing, for degrading the at least one site ranking factor corresponding to the current site when the counter exceeds a counter threshold.

15. A site for use in a wireless trunked radio communication system comprising a plurality of subscriber units in wireless communication with a plurality of sites, the site comprising:

means for receiving, from a subscriber unit of the plurality of subscriber units, at least one inbound transmission;

means, coupled to the means for receiving, for determining signal quality information regarding the at least one inbound transmission; and means, coupled to the means for determining, for transmitting an inbound transmission feedback message to the subscriber unit when the signal quality information compares unfavorably with a signal quality threshold, wherein the inbound transmission feedback message instructs the subscriber unit to degrade at least one site ranking factor corresponding to the site.

\* \* \* \* \*

UNITED STATES PATENT AND TRADEMARK OFFICE
CERTIFICATE OF CORRECTION

PATENT NO. : 6,167,282　　　　　　　　　　　　　　　　　　　　　　　Page 1 of 1
DATED : December 26, 2000
INVENTOR(S) : Gary P. Hunsberger It is certified that error appears in the above-identified patent and that said Letters Patent is hereby corrected as shown below:

On title page,
Attorney name should be --Steven--, not "Srteven"

Signed and Sealed this

Fifth Day of June, 2001

Attest:

NICHOLAS P. GODICI

Attesting Officer

*Acting Director of the United States Patent and Trademark Office*